US012735002B2

(12) United States Patent
Cho

(10) Patent No.: US 12,735,002 B2
(45) Date of Patent: Sep. 15, 2026

(54) ELECTRONIC CONTROL APPARATUS AND BRAKE APPARATUS INCLUDING THE SAME

(71) Applicant: HL MANDO CORPORATION, Gyeonggi-do (KR)

(72) Inventor: Kyungran Cho, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 73 days.

(21) Appl. No.: 18/967,603

(22) Filed: Dec. 3, 2024

(65) Prior Publication Data

US 2026/0014966 A1 Jan. 15, 2026

(30) Foreign Application Priority Data

Jul. 9, 2024 (KR) ........................ 10-2024-0090684

(51) Int. Cl.
*B60T 7/18* (2006.01)
*B60T 7/04* (2006.01)
*B60W 50/023* (2012.01)

(52) U.S. Cl.
CPC .................................... *B60T 7/042* (2013.01)

(58) Field of Classification Search
CPC . B60T 7/042; B60T 7/18; B60T 8/885; B60T 13/66; B60T 13/662; B60T 2270/402; B60T 2270/403; B60T 2270/404; B60T 2270/413; B60W 50/023; B60W 2050/0292; H04L 12/40182
USPC ........................................................... 701/70
See application file for complete search history.

(56) References Cited

U.S. PATENT DOCUMENTS

| | | | | |
|---|---|---|---|---|
| 8,705,527 | B1 | 4/2014 | Addepalli et al. | |
| 11,265,208 | B1 * | 3/2022 | Massey | H04L 41/0654 |
| 2019/0288959 | A1 * | 9/2019 | Kusano | H04L 45/34 |
| 2021/0237698 | A1 * | 8/2021 | Bailey | B60T 8/885 |
| 2021/0347370 | A1 * | 11/2021 | Nemeth | B60T 8/885 |

FOREIGN PATENT DOCUMENTS

| | | | | |
|---|---|---|---|---|
| EP | 1672505 | A2 * | 6/2006 | G06F 11/1637 |
| EP | 4489333 | A1 * | 1/2025 | H04L 12/40182 |
| KR | 10-1633063 | | 6/2016 | |
| KR | 10-2066221 | | 1/2020 | |

* cited by examiner

*Primary Examiner* — Erick R Solis
(74) *Attorney, Agent, or Firm* — WOMBLE BOND DICKINSON (US) LLP

(57) ABSTRACT

The present disclosure relates to an electronic control apparatus including a housing, first and second controllers which are accommodated in the housing and control a motor, first and second internal transceivers provided the first controller, third and fourth internal transceivers provided in the second controller, first and second connectors which pass through opposite sides of the housing and are connected to the second and fourth internal transceivers respectively, first internal communication network connecting the first and third internal transceivers, and second internal communication network connecting the second and fourth internal transceivers outside the housing, and a brake apparatus including the same.

20 Claims, 5 Drawing Sheets

ELECTRONIC CONTROL APPARATUS AND BRAKE APPARATUS INCLUDING THE SAME

CROSS-REFERENCE TO RELATED APPLICATIONS

This application claims the priority of Korean Patent Application No. 10-2024-0090684 filed on Jul. 9, 2024, in the Korean Intellectual Property Office, the disclosure of which is incorporated herein by reference.

BACKGROUND

Field

The present disclosure relates to an electronic control apparatus and a brake apparatus providing redundancy in communication method between controllers and in communication networks.

Description of the Related Art

In a vehicle, a brake system for performing brake is essentially mounted and various types of brake systems for safety of drivers and passengers are being proposed.

In recent years, as the electronic brake becomes more popular and the autonomous driving system becomes widespread, failure of electric/electronic systems or failure of a power source applied thereto may become fatal risk factor for vehicle safety. Accordingly, efforts are being made to ensure the safety by adopting redundant ECUS, rather than using a single electronic control unit (ECU).

When the redundant ECU is used, each ESU requires an internal transceiver between ECUs to have different operation modes according to a state of the other ECU. However, when failure occurs in the internal transceiver between ECUs, each ECU cannot check the state of the other ECU, which results in the failure of the system.

Accordingly, the redundancy needs to be ensured for the communication between ECUs.

SUMMARY

An aspect of the present disclosure is to provide an electronic control apparatus in which the redundancy of the communication method and the communication network between controllers is ensured.

Another aspect of the present disclosure is to provide a brake apparatus in which the redundancy of the communication method and the communication network between controllers is ensured.

According to an aspect of the present disclosure, an electronic control apparatus includes a housing; a first controller and a second controller which are accommodated in the housing and control a motor; a first internal transceiver and a second internal transceiver provided in the first controller; a third internal transceiver and a fourth internal transceiver provided in the second controller; a first connector which passes through one side of the housing, is fixed to the housing, and is connected to the second internal transceiver; a second connector which passes through the other side of the housing, is fixed to the housing, and is connected to the fourth internal transceiver; a first internal communication network which communicatively connects the first internal transceiver and the third internal transceiver in the housing; and a second internal communication network which connects the first connector and the second connector on the outside of the housing to communicatively connect the second internal transceiver and the fourth internal transceiver.

The second internal communication network is configured by a wire harness which connects the first connector and the second connector.

The first connector is insert-molded in one side of the housing and the second connector is insert-molded in the other side of the housing.

The electronic control apparatus further includes: a first external transceiver provided in the first controller; and a second external transceiver provided in the second controller, and the first controller and the second controller are connected to a vehicle communication network through the first external transceiver and the second external transceiver, respectively.

A vehicle communication protocol between the first internal transceiver and the third internal transceiver and a vehicle communication protocol between the second internal transceiver and the fourth internal transceiver are different vehicle communication protocols.

The vehicle communication protocol between the first internal transceiver and the third internal transceiver is a bidirectional communication method and the vehicle communication protocol between the second internal transceiver and the fourth internal transceiver is a multi-master communication method.

The first internal communication network is configured by a bus bar which connects the first internal transceiver and the third internal transceiver.

The first controller includes first printed circuit board and a first processor mounted on the first printed circuit board and the second controller includes a second printed circuit board and a second processor mounted on the second printed circuit board.

The first controller includes a first processor mounted on a printed circuit board and the second controller includes a second processor which is mounted on the printed circuit board to be spaced apart from the first processor.

The first processor and the second processor determine a failure of the second processor or a failure of the first processor using at least one of the first internal communication network and the second internal communication network, The first processor outputs a control signal based on the failure of the second processor and the second processor outputs a control signal based on the failure of the first processor.

According to an aspect of the present disclosure, a brake apparatus includes a pedal sensor; a motor; a valve; a pressure sensor; and an electronic control apparatus which controls at least one of the motor and the valve based on outputs of the pedal sensor and the pressure sensor. The electronic control apparatus includes: a housing; a first controller and a second controller which are accommodated in the housing and control the motor; a first internal transceiver and a second internal transceiver provided in the first controller; a third internal transceiver and a fourth internal transceiver provided in the second controller; a first connector which passes through one side of the housing, is fixed to the housing, and is connected to the second internal transceiver; a second connector which passes through the other side of the housing, is fixed to the housing, and is connected to the fourth internal transceiver; a first internal communication network which communicatively connects the first internal transceiver and the third internal transceiver in the housing; and a second internal communication network which connects the first connector and the second connector on the outside of the housing to communicatively connect the second internal transceiver and the fourth internal transceiver.

The second internal communication network is configured by a wire harness which connects the first connector and the second connector.

The first connector is insert-molded in one side of the housing and the second connector is insert-molded in the other side of the housing.

The electronic control apparatus further includes: a first external transceiver provided in the first controller; and a second external transceiver provided in the second controller, and the first controller and the second controller are connected to a vehicle communication network through the first external transceiver and the second external transceiver, respectively.

A vehicle communication protocol between the first internal transceiver and the third internal transceiver and a vehicle communication protocol between the second internal transceiver and the fourth internal transceiver are different vehicle communication protocols.

The vehicle communication protocol between the first internal transceiver and the third internal transceiver is a bidirectional communication method and the vehicle communication protocol between the second internal transceiver and the fourth internal transceiver is a multi-master communication method.

The first controller includes a first printed circuit board and a first processor mounted on the first printed circuit board and the second controller includes a second printed circuit board and a second processor mounted on the second printed circuit board.

The first internal communication network is configured by a bus bar which connects the first internal transceiver and the third internal transceiver.

The first processor and the second processor determine a failure of the second processor or a failure of the first processor using at least one of the first internal communication network and the second internal communication network, the first processor outputs a control signal based on the failure of the second processor and the second processor outputs a control signal based on the failure of the first processor.

According to the aspect of the present disclosure, the redundancy is ensured for the communication method and the communication network to provide the safety to the communication between controllers.

Accordingly, the communication failure between controllers due to a single cause may be suppressed.

The effects of the present disclosure are not limited to the aforementioned effects, and other effects, which are not mentioned above, will be apparently understood to a person having ordinary skill in the art from the following description.

The objects to be achieved by the present disclosure, the means for achieving the objects, and the effects of the present disclosure described above do not specify essential features of the claims, and, thus, the scope of the claims is not limited to the disclosure of the present disclosure.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
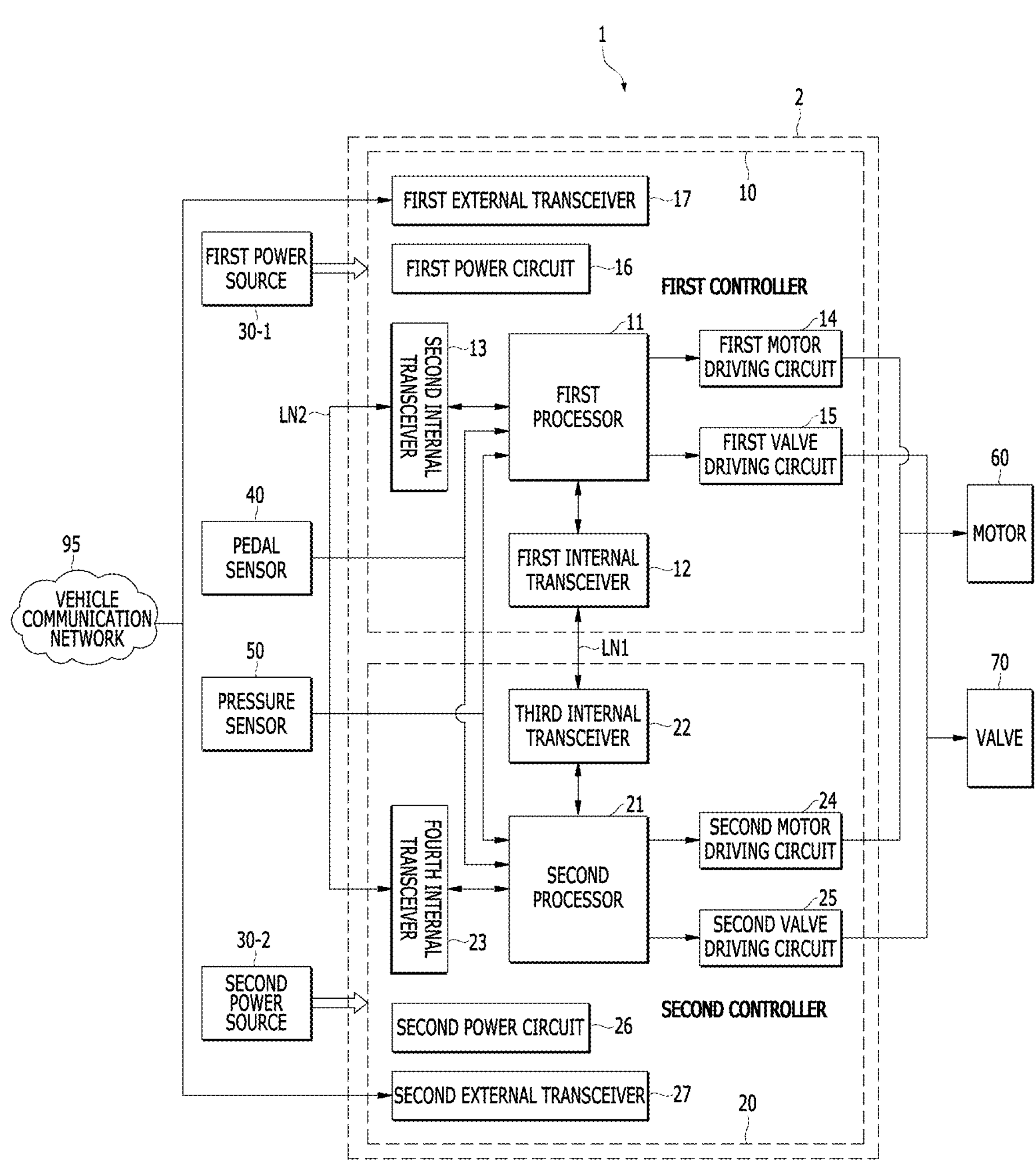
FIG. 1 is a view schematically illustrating a brake apparatus including an electronic control apparatus according to one exemplary embodiment.

Hereinafter, the exemplary embodiment of the present disclosure will be described with reference to the accompanying drawings and exemplary embodiments as follows. Scales of components illustrated in the accompanying drawings are different from the real scales for the purpose of description, so that the scales are not limited to those illustrated in the drawings.

Like reference numerals denote like elements throughout the specification. The specification does not describe all the elements of the exemplary embodiments, but general contents in the technical field to which the present invention belongs or the redundant description of the exemplary embodiments may be omitted. Terms “unit, module, member, and block” used in the specification may be implemented by software or hardware and according to the exemplary embodiments, a plurality of “units, modules, members, and blocks” may be implemented by one component or one “unit, module, member, and block” may include a plurality of components.

Throughout the specification, when a part is said to be “connected” to another part, it means that the part may not only be directly connected, but also be indirectly connected to the other part.

In addition, unless explicitly described to the contrary, the word “comprise” and variations such as “comprises” or “comprising”, will be understood to imply the inclusion of stated elements but not the exclusion of any other elements.

The terms such as first or second may be used to distinguish one component from the other component, but the components are not limited by the above-described terms.

A singular form may include a plural form if there is no clearly opposite meaning in the context.

In each step, the reference symbol is used for the convenience of description so that the reference symbol does not describe the order of each step and the steps may be carried out in a different order from the specified order unless specific order is clearly described in the context.

Hereinafter, operating principles and exemplary embodiments of the present disclosure will be described with reference to the accompanying drawings.

FIG. 1 is a view schematically illustrating a brake apparatus including an electronic control apparatus according to one exemplary embodiment.

An electronic control apparatus 2 installed in a brake apparatus 1 illustrated in FIG. 1 is merely an example of the electronic control apparatus of the present disclosure. Any of electric/electronic apparatus which is installed in a vehicle may correspond to the electronic control apparatus of the present disclosure. The electronic control apparatus 2 of the present disclosure may be an engine control unit (ECU), transmission control unit (TCU), an electronic control unit (ECU) of an electric power steeling (EPS), a body control unit (BCU), or a vehicle control unit.

As illustrated in FIG. 1, the brake apparatus 1 includes a first power source 30-1, a second power source 30-2, a pedal sensor 40, a pressure sensor 50, a motor 60, a valve (valves) 70, and an electronic control apparatus 2 including a first controller 10 and a second controller 20. The first power source 30-1, the second power source 30-2, the pedal sensor 40, the pressure sensor 50, the motor 60, and the valve (valves) 70 illustrated in FIG. 1 are not essential configurations of the present disclosure, but may be omitted.

The brake apparatus 1 supplies a pressure (hereinafter, referred to as a "hydraulic pressure") of a pressurization medium (for example, a brake oil) to a plurality of wheels installed in a vehicle based on an output signal of the pedal sensor 40 to brake the vehicle.

For example, the brake apparatus 1 includes a hydraulic pressure supplying device which generates a hydraulic pressure and a hydraulic pressure control device which controls the generated hydraulic pressure. For example, the hydraulic pressure supplying device includes a piston-cylinder pump or a rotary pump which is driven by the motor 60. The hydraulic control device may include a flow passage extending to a wheel cylinder installed in the wheel of the vehicle from the hydraulic supplying device and a valve (valves) 70 which opens or closes the flow passage.

The pedal sensor 40 senses a movement of the brake pedal which represents a driver's intention to brake and outputs an electric signal (for example, a voltage signal or a current signal) corresponding to the brake movement (hereinafter, referred to as a "pedal signal"). The brake pedal moves by the driver and the pedal sensor 40 senses the movement of the brake pedal caused by the driver. The pedal sensor 40 outputs a pedal signal corresponding to displacement of the brake pedal or a movement speed of the brake pedal to the first controller 10 and the second controller 20.

The motor 60 supplies a power (torque) for generating a hydraulic pressure to the piston-cylinder pump or the rotary pump. For example, the torque of the motor 60 is converted into a translational motive force by a power conversion device (for example, a spindle-nut or a pinion-rack) and the piston of the piston-cylinder pump moves in translation by the translational motive force. Further, a rotor of the rotary pump may rotate by the torque of the motor 60.

The motor 60 includes a rotor and a stator and the rotor or the stator includes a plurality of coils which generates a rotating magnetic field. The motor 60 is driven by the motor driving current supplied to the plurality of coils.

The valve (valves) 70 allows or blocks the hydraulic pressure which is generated by the hydraulic supplying device to be supplied to the wheel cylinder. Moreover, the valve (valves) 70 modulates or regulates the hydraulic pressure which is generated by the hydraulic supplying device to be supplied to the wheel cylinder.

The valve (valves) 70 includes a solenoid valve which is electrically controllable. The solenoid valve includes a coil which generates a magnetic field. The valve (valves) 70 is open (normal close type valve) or closed (normal open type valve) by the valve driving current which is supplied to the coil.

The pressure sensor 50 is provided on the flow passage extending from the hydraulic pressure supplying device to the wheel cylinder and measures the hydraulic pressure which is generated by the hydraulic supplying device to be supplied to the wheel cylinder. Further, the pressure sensor 50 may output an electric signal (for example, a voltage signal or a current signal) (hereinafter, referred to as a "pressure signal") corresponding to the measured hydraulic pressure. The hydraulic pressure of the flow passage changes by the operation of the motor 60 and/or the valve 70 and the pressure sensor 50 measures a changing hydraulic pressure of the flow passage.

The first power source 30-1 and/or the second power source 30-2 supplies a power to the first controller 10 and/or the second controller 20 included in the electronic control apparatus 2. Even though it is illustrated in FIG. 1 that the first power source 30-1 and the second power source 30-2 supply electric power to the first controller 10 and the second controller 20, respectively, this is just an example.

For example, the first power source 30-1 and the second power source 30-2 are connected to a power switching device (not illustrated) and the power switching device is connected to the first controller 10 and the second controller 20. The power switching device switches to supply the power supplied from the first power source 30-1 and/or the second power source 30-2 to any one of the first controller 10 or the second controller 20 based on a state of the first controller 10 and/or the second controller 20. Alternatively, the power switching device may supply only any one power to the first controller 10 and/or the second controller 20 based on the state of the first power source 30-1 and/or the second power source 30-2.

As described above, the first power source 30-1 and the second power source 30-2 are configured to supply a stable power, thereby additionally providing a redundancy in terms of the power.

The first controller 10 controls the motor 60 and/or the valve (valves) 70 based on an output signal of the pedal sensor 40 and/or the pressure sensor 50. For example, the first controller 10 includes a first motor driving circuit 14, a first valve driving circuit 15, a first power circuit 16, a first internal transceiver 12, a second internal transceiver 13, a first external transceiver 17, and a first processor 11. The first motor driving circuit 14, the first valve driving circuit 15, and the first external transceiver 17 illustrated in FIG. 1 do not correspond to essential configurations of the first controller 10 according to an exemplary embodiment and may be omitted.

The first motor driving circuit 14 is connected to a coil which configures the motor 60 and controls a motor driving current which flows through the coil.

The first motor driving circuit 14 receives a control signal from the first processor 11 and controls a motor driving current which drives the motor 60 in response to a control signal of the first processor 11. The first motor driving circuit 14 controls the motor driving current to increase the hydraulic pressure of the hydraulic supplying device in response to a pressurization signal of the first processor 11. Further, the first motor driving circuit 14 controls the motor driving current to decrease the hydraulic pressure of the hydraulic supplying device in response to a depressurization signal of the first processor 11.

The first motor driving circuit 14 includes an inverter circuit or a H-bridge circuit which controls a motor driving current supplied to the motor 60. The inverter circuit or the H-bridge circuit includes a plurality of transistors which is turned on or off in response to a control signal of the first processor 11.

The first valve driving circuit 15 is connected to a coil which configures the valve 70 and controls a valve driving current which flows through the coil.

The first valve driving circuit 15 receives a control signal from the first processor 11 and controls a valve driving current which drives the valve 70 in response to a control signal of the first processor 11. For example, the first valve driving circuit 15 controls a valve driving current to open the valve 70 in response to an open signal of the first processor 11. Further, the first valve driving circuit 15 controls a valve driving current to close the valve 70 in response to a close signal of the first processor 11.

The first valve driving circuit 15 includes a switching circuit which controls a valve driving current which is supplied to the valve 70. The switching circuit includes a transistor which is turned on or off in response to a control signal of the first processor 11.

The first power circuit 16 receives a power from the first power source 30-1 and converts the voltage of the power. The first power circuit 16 may supply the voltage-converted power to the pedal sensor 40, the pressure sensor 50, the first motor driving circuit 14, the first valve driving circuit 15 and/or the first processor 11.

The first power circuit 16 converts a power into a plurality of the power of different voltages. For example, the first power circuit 16 converts a voltage of an original power into a first voltage suitable for the pedal sensor 40, the pressure sensor 50 and/or the first processor 11 and also converts a voltage of an original power into a second voltage suitable for the first motor driving circuit 14 and/or the first valve driving circuit 15.

The first power circuit 16 includes at least one DC-DC converter or at least one regulator. The DC-DC converter includes at least one inductor and at least one capacitor. The regulator includes a breakdown diode.

The first processor 11 of the first controller 10 is communicatively connected to a second processor 21 of the second controller 20. The first processor 11 supplies an operation state (for example, a normal operation state or a failure state) of the first controller 10 to the second processor 21. Further, the second processor 21 supplies an operation state of the second controller 20 to the first processor 11. For example, the first processor 11 supplies a periodic signal (for example, a pulse signal or a sine wave signal) to the second processor 21 during the normal operation. Further, the second processor 21 supplies a periodic signal (for example, a pulse signal or a sine wave signal) to the first processor 11 during the normal operation.

At this time, the first controller 10 and the second controller 20 perform communication through a redundant communication network or communication method dedicated to the electronic control apparatus 2.

The first internal transceiver 12 of the first controller 10 transmits the operation state of the first processor 11 to a third internal transceiver 22 of the second controller 20 and receives the operation state of the second processor 21 from the third internal transceiver 22. Here, the first internal transceiver 12 and the third internal transceiver 22 communicate through a first internal communication network (LN1, local network 1).

The second internal transceiver 13 of the first controller 10 transmits the operation state of the first processor 11 to a fourth internal transceiver 23 of the second controller 20 and receives the operation state indicating whether the operation of the second processor 21 is normal, from the fourth internal transceiver 23. Here, the second internal transceiver 13 and the fourth internal transceiver 23 communicate through a second internal communication network (LN2, local network 2).

The first external transceiver 17 is connected to a vehicle communication network 95 through an external communication network network) to perform (GN, global communication. Further, the second external transceiver 27 is connected to the vehicle communication network 95 through the external communication network (GN, global network) to perform communication. The first controller 10 and the second controller 20 exchange signals with the other system and/or components in the vehicle through the first external transceiver 17 and the second external transceiver 27. For example, the first controller 10 and the second controller 20 exchange signals with a steering control system, a driving control system, and a power control system, through Ethernet, media oriented systems transport (MOST), Flexray, a controller area network (CAN), or a local interconnect network (LIN).

The first internal communication network LN1 and the second internal communication network LN2 are separately (independently) provided. That is, the first internal communication network LN1 and the second network communication network LN2 provide communication networks which are physically separated from each other. The first internal transceiver 12, the second internal transceiver 13, the third internal transceiver 22, the fourth internal transceiver 23, the first external transceiver 17, the second external transceiver 27, the first internal communication network LN1, the second internal communication network LN2, and the external communication network GN will be described in more detail with reference to FIGS. 2 to 4.

The first processor 11 receives a pedal signal of the pedal sensor 40 and a pressure signal of the pressure sensor 50 and supplies the first motor control signal to the first motor driving circuit 14 and supplies a first valve control signal to the first valve driving circuit 15. For example, the first processor 11 supplies the first motor control signal and the first valve control signal to the first motor driving circuit 14 and the first valve driving circuit 15, respectively, to supply a hydraulic pressure to the wheel cylinder based on the pedal sensor 40 corresponding to a driver's intention to initiate braking. Further, the first processor 11 supplies the first motor control signal and the first valve control signal to the first motor driving circuit 14 and the first valve driving circuit 15, respectively, to recover a hydraulic pressure of the wheel cylinder based on the pedal signal corresponding to a driver's intention to stop braking.

The second controller 20 controls the motor 60 and/or the valve 70 based on an output signal of the pedal sensor 40 and/or the pressure sensor 50. For example, the second controller 20 includes a second motor driving circuit 24, a second valve driving circuit 25, a second power circuit 26, a third internal transceiver 22, a fourth internal transceiver 23, a second external transceiver 27, and a second processor 21. The second motor driving circuit 24, the second valve driving circuit 25, and the second external transceiver 27 illustrated in FIG. 1 do not correspond to essential configurations of the second controller 20 according to an exemplary embodiment and the second motor driving circuit 24, the second valve driving circuit 25, and/or the second external transceiver 27 may be omitted.

A configuration and a function of the second controller 20 may be the same as a configuration and a function of the first controller 10. In other words, the configurations and the functions of the second motor driving circuit 24, the second valve driving circuit 25, the second power circuit 26, the third internal transceiver 22, the fourth internal transceiver 23, the second external transceiver 27, and the second processor 21 are the same as the configurations and the functions of the first motor driving circuit 14, the first valve driving circuit 15, the first power circuit 16, the first internal transceiver 12, the second internal transceiver 13, the first external transceiver 17, and the first processor 11.

The second controller 20 may operate auxiliary to the first controller 10. For example, the second controller 20 does not operate or does not output a control signal during the normal operation of the first controller 10, but operates when a failure of the first controller 10 is sensed. In other words, the second controller 20 outputs a control signal when a failure of at least one of the first motor driving circuit 14, the first valve driving circuit 15, the first power circuit 16, the first internal transceiver 12, the second internal transceiver 13, the first external transceiver 17, and the first processor 11.

The first controller 10 may operate auxiliary to the second controller 20. For example, the first controller 10 does not operate or does not output a control signal during the normal operation of the second controller 20, but operates when a failure of the second controller 20 is sensed. In other words, the first controller 10 outputs a control signal when a failure of at least one of the second motor driving circuit 24, the second valve driving circuit 25, the second power circuit 26, the third internal transceiver 22, the fourth internal transceiver 23, the second external transceiver 27, and the second processor 21 is sensed.

According to an example, the first controller 10 and the second controller 20 may cooperatively operate. For example, both the first controller 10 and the second controller 20 may normally operate or output a control signal.

As described above, the first controller 10 and the second controller 20 may provide redundancy to the electronic control apparatus 10 and the brake apparatus 1 including the same.

Figure 2:
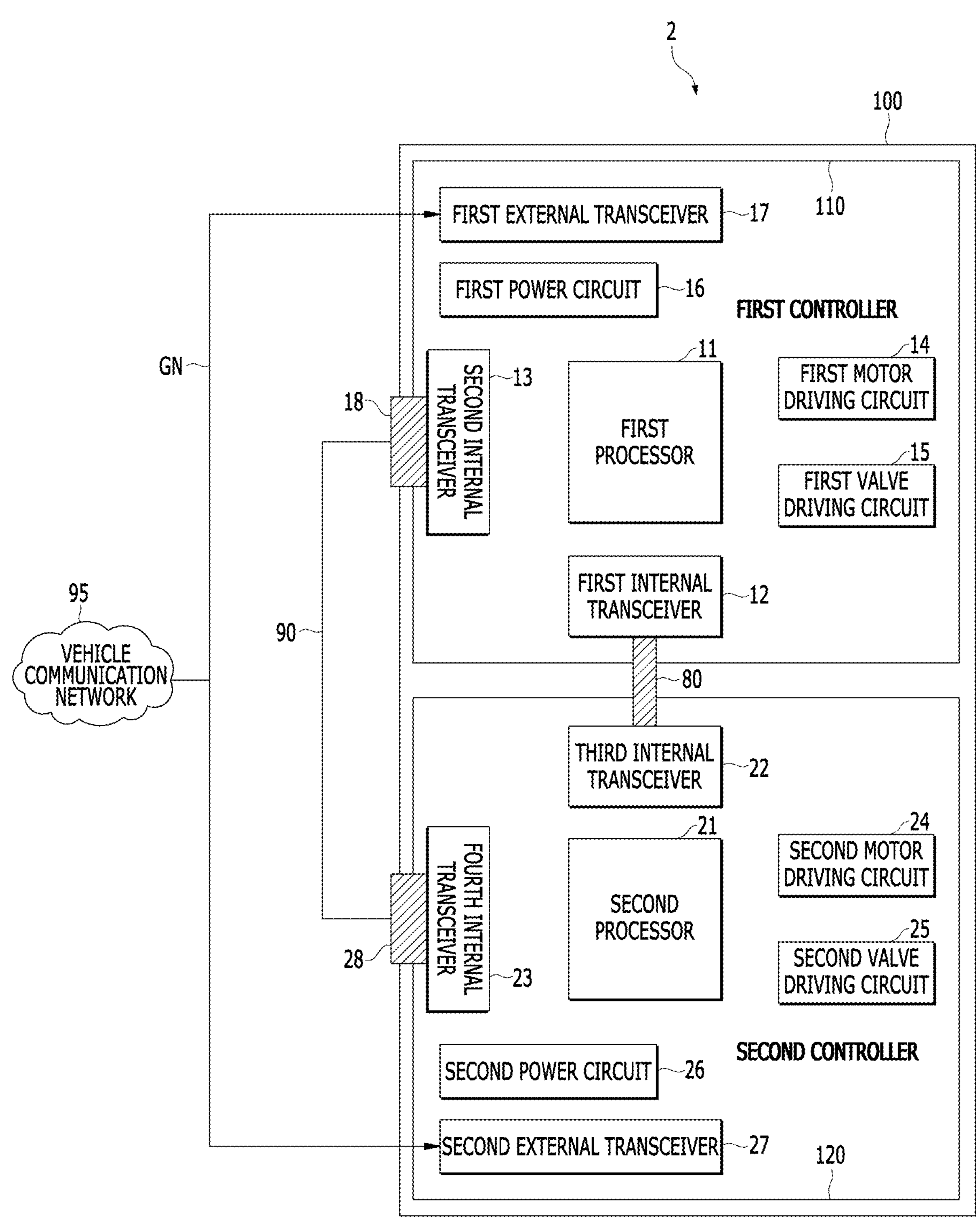
FIG. 2 is a view schematically illustrating an electronic control apparatus according to an exemplary embodiment.

FIG. 2 is a view schematically illustrating an electronic control apparatus according to an exemplary embodiment and FIG. is an exploded perspective view of an electronic control apparatus according to one exemplary embodiment.

Figure 5:
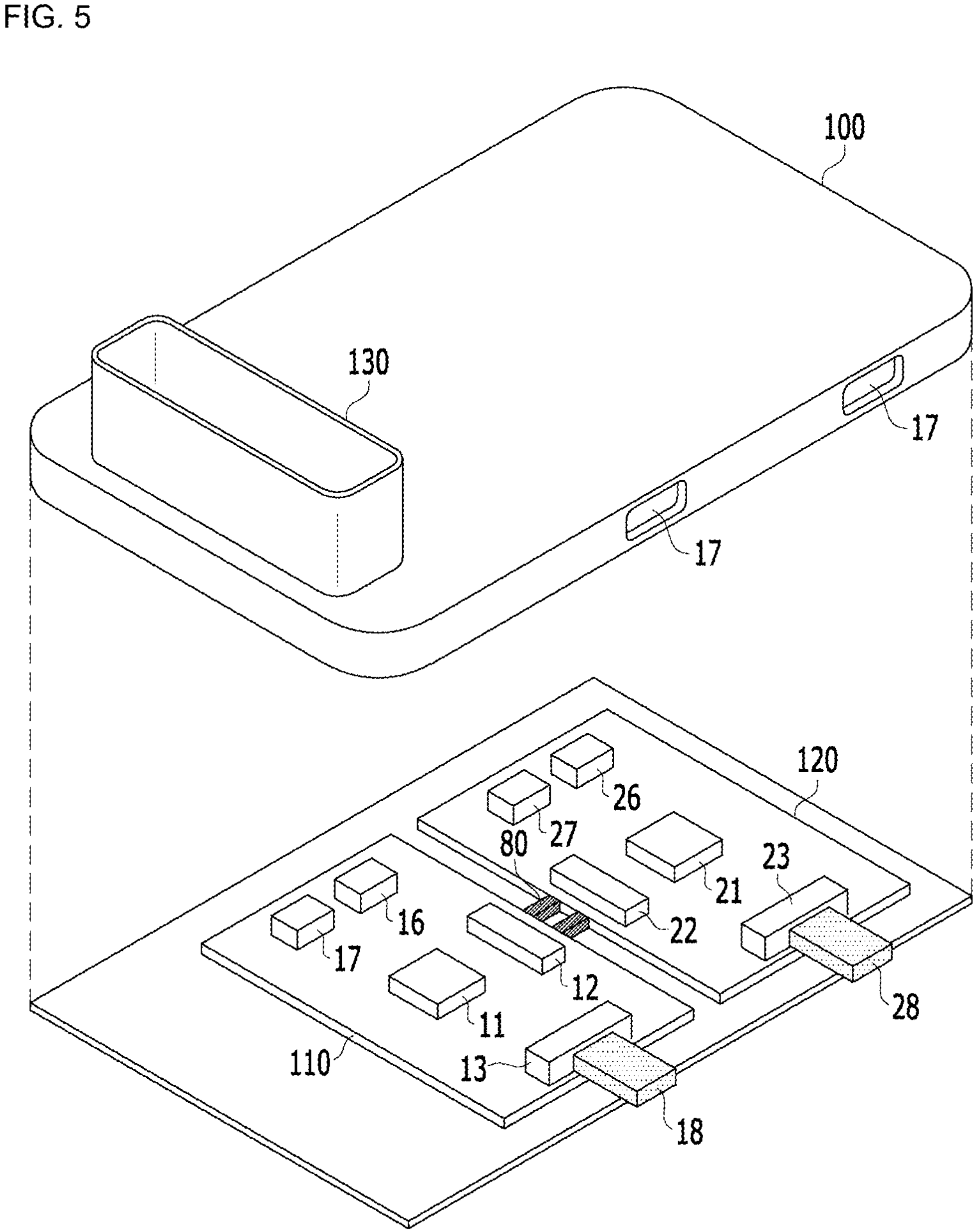
FIG. 5 is an exploded perspective view of an electronic control apparatus according to one exemplary embodiment.

Referring to FIGS. 2 and 5, the electronic control apparatus 2 includes a housing 100, a bus bar 80, a first connector 18, a second connector 28, a wire harness 90, a first controller 10, and a second controller 20.

The first controller 10 and the second controller 20 may be implemented on a first printed circuit board 110 and a second printed circuit board 120, respectively.

For example, the first processor 11, the first motor driving circuit 14, the first valve driving circuit 15, the first power circuit 16, the first internal transceiver 12, the second internal transceiver 13, and the first external transceiver 17 which configure the first controller 10 may be mounted on the first printed circuit board 110. The second processor 21, the second motor driving circuit 24, the second valve driving circuit 25, the second power circuit 26, the third internal transceiver 22, the fourth internal transceiver 23, and the second external transceiver 27 which configure the second controller 20 may be mounted on the second printed circuit board 120.

The bus bar 80 connects the first printed circuit board 110 and the second printed circuit board 120 to connect the first internal transceiver 12 and the third internal transceiver 22 in the housing 100. That is, the bus bar 80 serves to configure the first internal communication network LN1 illustrated in FIG. 1.

The first connector 18 passes through one side of the housing 100 to be connected to the second internal transceiver 13. By doing this, one end of the first connector 18 is exposed to the outside of the housing 100 and the other end is connected to the second internal transceiver 13 provided on the first printed circuit board 110 in the housing 100. At this time, the first connector 18 is insert-molded in a first through hole 141 provided on one side of the housing 100.

The second connector 18 passes through the other side of the housing 100 to be connected to the fourth internal transceiver 23, similar to the first connector 18. By doing this, one end of the second connector 28 is exposed to the outside of the housing 100 and the other end is connected to the fourth internal transceiver 23 provided on the second printed circuit board 120 in the housing 100. At this time, the second connector 28 is insert-molded in a second through hole 142 provided on the other side of the housing 100.

On one side surface of the housing 100, a power connector 130 which receives a power from the first power source 30-1 and the second power source 30-2 and makes a connection with the vehicle communication network 95 is provided. The power connector 130 may be exposed to the outside of the housing 100.

As illustrated in FIG. 2, the first connector 18 and the second connector 28 are connected by the wire harness 90. That is, the wire harness 90 which connects the first connector 18 and the second connector 28 serves to configure the second internal communication network LN2 which connects the first controller 10 and the second controller 20 on the outside of the housing 100.

Even though in FIGS. 2 and 5, it is illustrated that the first controller 10 and the second controller 20 are mounted on separate printed circuit boards 110 and 120, respectively, the present disclosure is not limited thereto.

For example, the first controller 10 and the second controller 20 may be mounted on a single printed circuit board to be separated from each other.

As described above, the first internal communication network LN1 is implemented in the housing 100 through the bus bar 80 and the second internal communication network LN2 is implemented on the outside of the housing 100 through the wire harness 90 to form a redundancy of the communication network between the controllers 10 and 20. As the redundancy of the communication network is formed, a potential common cause of a communication failure may be removed. That is, two communication networks LN1 and LN2 do not cause failure simultaneously due to any one specific cause of the communication failure.

There are various causes of the communication failure. For example, there may be hardware causes, such as a physical damage or defect of an electric wire, a connector, or a bus, electromagnetic causes, such as strong electromagnetic field, crosstalk between electric wires, or a high voltage spike, or causes due to protocols, such as a timing of a communication protocol or a synchronization problem. In addition, there may be various causes, such as outside attack caused by the hacking.

Accordingly, the first processor 11 and the second processor 21 may determine the failure of the second processor 21 or the failure of the first processor 11 using at least one of the first internal communication network LN1 and the second internal communication network LN2. The first processor 11 outputs a control signal based on the failure of the second processor 21 and the second processor 21 outputs a control signal based on the failure of the first processor 11.

The first internal transceiver 12 and the third internal transceiver 22 and the second internal transceiver 13 and the fourth internal transceiver 23 perform multi-master and/or bidirectional master/slave communication through the first internal communication network LN1 and the second internal communication network LN2, respectively. The individual controllers 10 and 20 are demanded to independently operate to establish a redundant system. Such a principle is applied to the communication between the controllers 10 and 20 in the same way so that the same communication method needs to be applied to the controllers 10 and 20 in terms of the communication. Accordingly, the first internal transceiver 12 and the third internal transceiver 22 and the second internal transceiver 13 and the fourth internal transceiver 23 should perform the multi-master or bidirectional master/slave communication.

Figure 3:
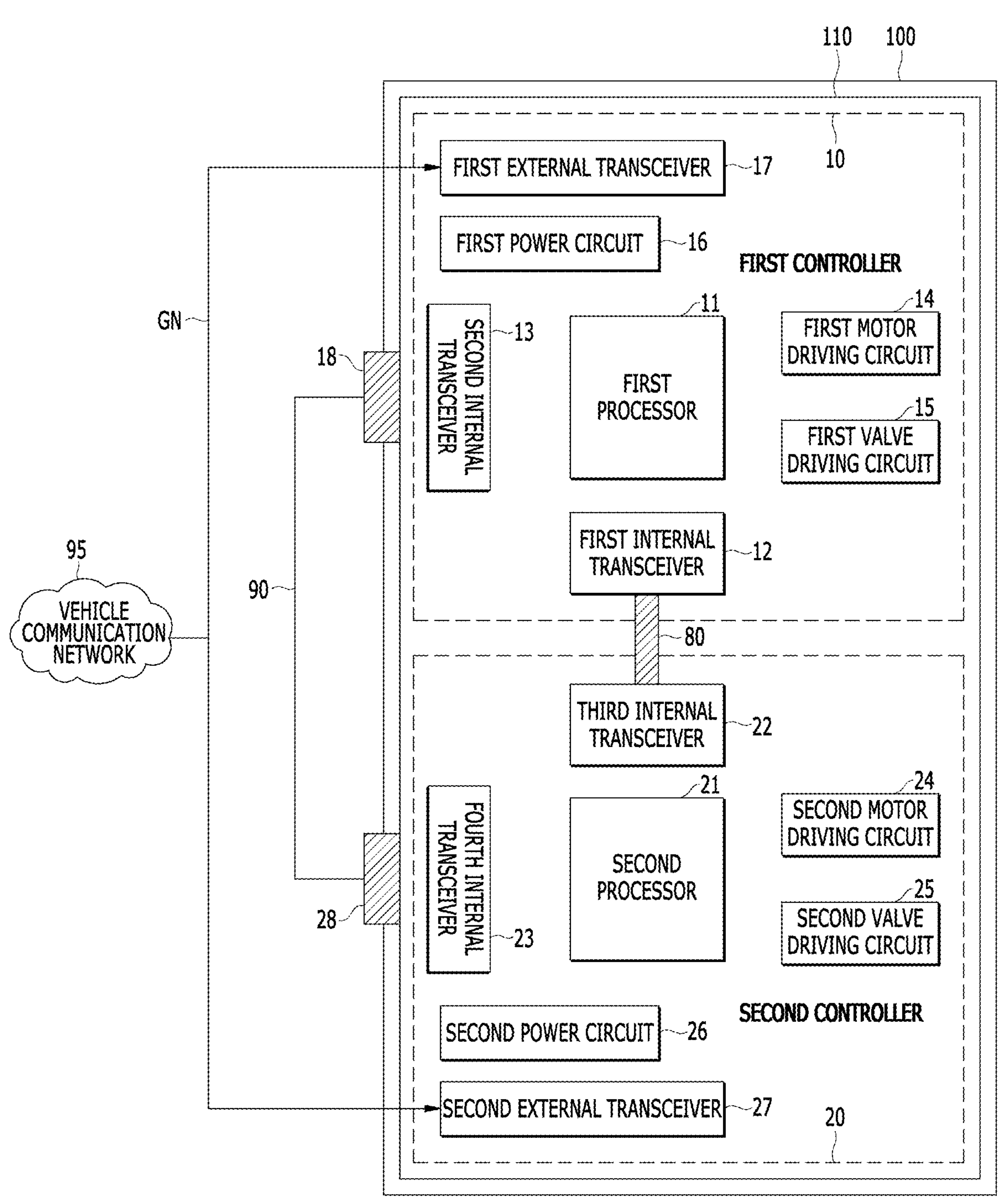
FIG. 3 is a view schematically illustrating an electronic control apparatus according to another exemplary embodiment.

FIG. 3 is a view schematically illustrating an electronic control apparatus according to another exemplary embodiment.

In FIG. 2, the first controller 10 and the second controller 20 are mounted on the first printed circuit board 110 and the second printed circuit board 120, respectively, but a first controller 10 and a second controller 20 of FIG. 3 are mounted on a single printed circuit board 110.

The first controller 10 of FIG. 3 includes a first processor 11 mounted on the printed circuit board 110 and the second controller 20 includes a second processor 21 mounted on the printed circuit board 110 to be spaced apart from the first processor 11.

A first motor driving circuit 14, a first valve driving circuit 15, a first power circuit 16, a first internal transceiver 12, a second internal transceiver 13, and a first external transceiver 17 are mounted to be adjacent to the first processor 11 to form a virtual area. A second motor driving circuit 24, a second valve driving circuit 25, a second power circuit 26, a second internal transceiver 22, a fourth internal transceiver 23, and a second external transceiver 27 are mounted to be adjacent to the second processor 21 to form another virtual area. Therefore, the virtual area configured by the first controller 10 and the other virtual area configured by the second controller 20 are located to be spaced apart from each other with a predetermined distance on the printed circuit board 110 without having an overlapping area.

The first internal transceiver 12 and the third internal transceiver 22 are mounted on the same printed circuit board 110 so that the first internal communication network 80 may be configured by a bus.

Figure 4:
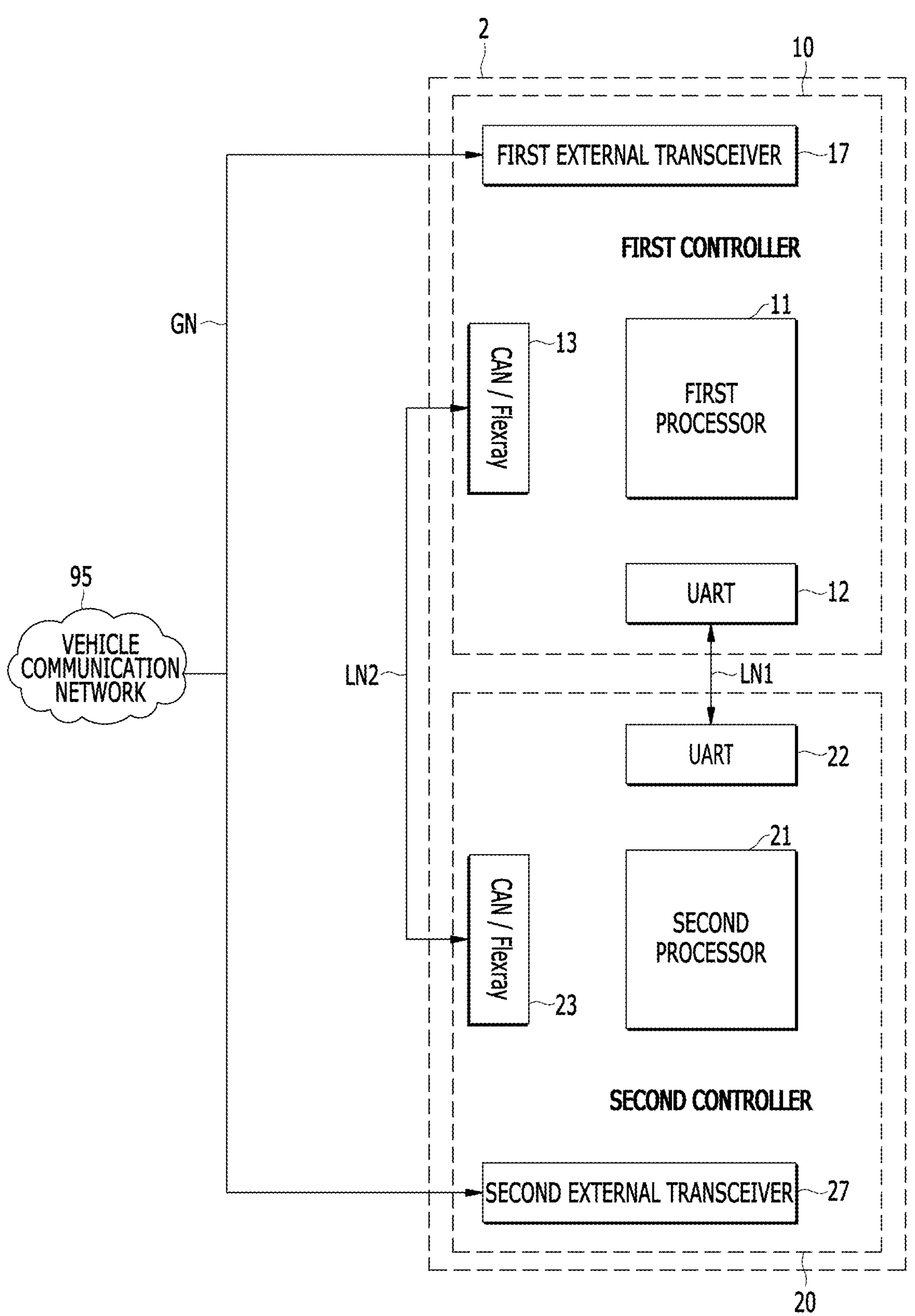
FIG. 4 is a view schematically illustrating redundant communication method and communication network between controllers according to one exemplary embodiment.

FIG. 4 is a view schematically illustrating redundant communication method and communication network between controllers according to one exemplary embodiment.

Referring to FIG. 4, the first internal transceiver 12 and the third internal transceiver 22 perform bidirectional master/slave communication through a first internal communication network LN1. For example, the first internal transceiver 12 and the third internal transceiver 22 performs universal asynchronous receiver/transmitter (UART) communication.

The UART communication performs asynchronously low-speed serial communication between two devices. According to the UART communication, the data is transmitted without directly sharing a clock signal between a transmission side and a reception side. The clock signal is not shared so that the clock synchronization between the transmission side and the reception side is not demanded. The transmission side converts the data into serial data to transmit the data and each data frame is configured by start bit, data bit, parity bit (optional), and stop bit. The reception side decrypts the received data frame to restore original parallel data.

The UART communication has advantages of low cost and low power consumption so that it is appropriate to perform the internal communication between the first controller 10 and the second controller 20.

The second internal transceiver 13 and the fourth internal transceiver 23 perform multi-master communication through a second internal communication network LN2.

For example, the second internal transceiver 13 and the fourth internal transceiver 23 perform controller area network (CAN) communication. The CAN communication is a multi-master type and supports message based protocol, error detection and restoring functions to be widely used for vehicle communication which requires a high data reliability. When the second internal transceiver 13 and the fourth internal transceiver 23 perform the CAN communication, the CAN communication is not connected to the other system in the vehicle, but is only used for the communication between the controllers 10 and 20.

As another example, the second internal transceiver 13 and the fourth internal transceiver 23 perform FlexRay communication. The FlexRay communication operates as a multi-master method in which multiple nodes transmit and receive data in one network. The FlexRay network uses a combination of two communication modes of a time triggered mode and an event triggered mode which ensure periodic and deterministic data transmission. By doing this, high real-time performance and flexibility are provided.

The FlexRay communication may maintain continuity of data transmission through a redundant communication channel even though error occurs. As described above, the FlexRay communication supports up to two independent communication channels to provide higher data transfer rate and reliability than the CAN communication.

As described above, the first controller 10 and the second controller 20 use different communication networks (LN1 communication methods VS. LN2) and different (UART VS. CAN/FlexRay) to suppress communication disconnection due to a common cause, that is, a single cause.

An example of maintaining a stability according to different communication networks (LN1 vs. LN2) will be described as follows: For example, when any one of the first connector 18, the second connector 28, and the wire harness 30 is abnormal, the second internal communication network LN2 stops the communication. However, this cause is not related to the first internal transceiver 12, the third internal transceiver 22, and the bus bar 80 so that it does not cause a problem in the first internal communication network LN1. Accordingly, the first controller 10 and the second controller 20 consistently check their operation states through the first internal communication network LN1.

As another example, when a problem occurs in the bus bar 8 due to an instantaneous high voltage spike, the communication through the first internal communication network NL1 is stopped. In contrast, this cause is unlikely to affect the first connector 18, the second connector 28, and the wire harness 90. This is because the first connector 18 and the second connector 28 protrude to the outside of the housing 100. Accordingly, the first controller 10 and the second controller 20 consistently check their operation states through the second internal communication network LN2.

An example of maintaining a stability according to different communication methods (UART vs. CAN/FlexRay) will be described as follows: When a protocol error occurs in the communication between the first internal transceiver 12 and the third internal transceiver which 22 perform the UART communication, the first controller 10 and the second controller 20 check their operations using the second internal transceiver 13 and the fourth internal transceiver 23 which perform the CAN or FlexRay communication. In contrast, when a protocol error occurs in the communication between the second internal transceiver 13 and the fourth internal transceiver 23 which perform the CAN or FlexRay communication, the first controller 10 and the second controller 20 check their operations using the first internal transceiver 12 and the third internal transceiver 22 which perform the UART communication.

The redundancy of the communication network and the communication method of the electronic control apparatus 2 as described above suppresses the communication abnormality due to the common cause to further improve the safety of the autonomous vehicle.

It will be appreciated that various exemplary embodiments of the present invention have been described herein for purposes of illustration, and that various modifications, changes, and substitutions may be made by those skilled in the art without departing from the scope and spirit of the present invention. Therefore, the exemplary embodiments of the present disclosure are provided for illustrative purposes only but not intended to limit the technical concept of the present disclosure. The scope of the technical concept of the present disclosure is not limited thereto. The protection scope of the present disclosure should be interpreted based on the following appended claims and it should be appreciated that all technical spirits included within a range equivalent thereto are included in the protection scope of the present disclosure.

What is claimed is:

1. An electronic control apparatus, comprising:

a housing;

a first controller and a second controller which are accommodated in the housing and control a motor;

a first internal transceiver and a second internal transceiver provided in the first controller;

a third internal transceiver and a fourth internal transceiver provided in the second controller;

a first connector which passes through one side of the housing, is fixed to the housing, and is connected to the second internal transceiver;

a second connector which passes through the other side of the housing, is fixed to the housing, and is connected to the fourth internal transceiver;

a first internal communication network which communicatively connects the first internal transceiver and the third internal transceiver in the housing; and a second internal communication network which connects the first connector and the second connector on the outside of the housing to communicatively connect the second internal transceiver and the fourth internal transceiver.

2. The electronic control apparatus according to claim 1, wherein the second internal communication network is configured by a wire harness which connects the first connector and the second connector.

3. The electronic control apparatus according to claim 1, wherein the first connector is insert-molded in one side of the housing and the second connector is insert-molded in the other side of the housing.

4. The electronic control apparatus according to claim 1, further comprising:

a first external transceiver provided in the first controller; and a second external transceiver provided in the second controller, wherein the first controller and the second controller are connected to a vehicle communication network through the first external transceiver and the second external transceiver, respectively.

5. The electronic control apparatus according to claim 1, wherein a vehicle communication protocol between the first internal transceiver and the third internal transceiver and a vehicle communication protocol between the second internal transceiver and the fourth internal transceiver are different vehicle communication protocols.

6. The electronic control apparatus according to claim 5, wherein the vehicle communication protocol between the first internal transceiver and the third internal transceiver is a bidirectional communication method and the vehicle communication protocol between the second internal transceiver and the fourth internal transceiver is a multi-master communication method.

7. The electronic control apparatus according to claim 1, wherein the first internal communication network is configured by a bus bar which connects the first internal transceiver and the third internal transceiver.

8. The electronic control apparatus according to claim 1, wherein the first controller includes a first printed circuit board and a first processor mounted on the first printed circuit board and the second controller includes a second printed circuit board and a second processor mounted on the second printed circuit board.

9. The electronic control apparatus according to claim 1, wherein the first controller includes a first processor mounted on a printed circuit board and the second controller includes a second processor which is mounted on the printed circuit board to be spaced apart from the first processor.

10. The electronic control apparatus according to claim 8, wherein the first processor and the second processor determines a failure of the second processor or a failure of the first processor using at least one of the first internal communication network and the second internal communication network.

11. The electronic control apparatus according to claim 10, wherein the first processor outputs a control signal based on the failure of the second processor and the second processor outputs a control signal based on the failure of the first processor.

12. A brake apparatus, comprising:

a pedal sensor;

a motor;

a valve;

a pressure sensor; and an electronic control apparatus which controls at least one of the motor and the valve based on outputs of the pedal sensor and the pressure sensor, wherein the electronic control apparatus includes:

a housing;

a first controller and a second controller which are accommodated in the housing and control the motor;

a first internal transceiver and a second internal transceiver provided in the first controller;

a third internal transceiver and a fourth internal transceiver provided in the second controller;

a first connector which passes through one side of the housing, is fixed to the housing, and is connected to the second internal transceiver;

a second connector which passes through the other side of the housing, is fixed to the housing, and is connected to the fourth internal transceiver;

a first internal communication network which communicatively connects the first internal transceiver and the third internal transceiver in the housing; and a second internal communication network which connects the first connector and the second connector on the outside of the housing to communicatively connect the second internal transceiver and the fourth internal transceiver.

13. The brake apparatus according to claim 12, wherein the second internal communication network is configured by a wire harness which connects the first connector and the second connector.

14. The brake apparatus according to claim 12, wherein the first connector is insert-molded in one side of the housing and the second connector is insert-molded in the other side of the housing.

15. The brake apparatus according to claim 12, wherein the electronic control apparatus further includes:

a first external transceiver provided in the first controller; and a second external transceiver provided in the second controller, and the first controller and the second controller are connected to a vehicle communication network through the first external transceiver and the second external transceiver, respectively.

16. The brake apparatus according to claim 12, wherein a vehicle communication protocol between the first internal transceiver and the third internal transceiver and a vehicle communication protocol between the second internal transceiver and the fourth internal transceiver are different vehicle communication protocols.

17. The brake apparatus according to claim 16, wherein the vehicle communication protocol between the first internal transceiver and the third internal transceiver is a bidirectional communication method and the vehicle communication protocol between the second internal transceiver and the fourth internal transceiver is a multi-master communication method.

18. The brake apparatus according to claim 12, wherein the first controller includes a first printed circuit board and a first processor mounted on the first printed circuit board and the second controller includes a second printed circuit board and a second processor mounted on the second printed circuit board.

19. The brake apparatus according to claim 18, wherein the first internal communication network is configured by a bus bar which connects the first internal transceiver and the third internal transceiver.

20. The brake apparatus according to claim 18, wherein the first processor and the second processor determines a failure of the second processor or a failure of the first processor using at least one of the first internal communication network and the second internal communication network, the first processor outputs a control signal based on the failure of the second processor and the second processor outputs a control signal based on the failure of the first processor.

* * * * *